US008470386B2

(12) United States Patent
Villagran

(10) Patent No.: US 8,470,386 B2
(45) Date of Patent: Jun. 25, 2013

(54) RICE FLOUR COMPOSITIONS

(75) Inventor: Maria Dolores Martinez-Serna Villagran, Mason, OH (US)

(73) Assignee: Kellogg North America Company, Battle Creek, MI (US)

(*) Notice: Subject to any disclaimer, the term of this patent is extended or adjusted under 35 U.S.C. 154(b) by 1141 days.

(21) Appl. No.: 11/448,235

(22) Filed: Jun. 7, 2006

(65) Prior Publication Data

US 2006/0286271 A1   Dec. 21, 2006

Related U.S. Application Data

(60) Provisional application No. 60/687,965, filed on Jun. 7, 2005.

(51) Int. Cl.
*A21D 2/00* (2006.01)

(52) U.S. Cl.
USPC ............ 426/622; 426/618; 426/560; 426/552

(58) Field of Classification Search
USPC ........................................................ 426/622
See application file for complete search history.

(56) References Cited

U.S. PATENT DOCUMENTS

| | | | |
|---|---|---|---|
| 3,626,466 A | 12/1971 | Liepa | |
| 3,840,673 A | 10/1974 | Kortschot et al. | |
| 4,634,596 A | 1/1987 | Eastman | |
| 4,769,253 A | 9/1988 | Willard | |
| 4,770,891 A | 9/1988 | Willard | |
| 4,879,126 A | 11/1989 | Willard et al. | |
| 5,051,133 A | 9/1991 | Nagal et al. | |
| 5,085,884 A | 2/1992 | Young | |
| 5,320,858 A | 6/1994 | Fazzolare et al. | |
| 5,405,625 A | 4/1995 | Biggs | |
| 5,422,131 A | 6/1995 | Elsen | |
| 5,429,834 A | 7/1995 | Addesso et al. | |
| 6,224,921 B1* | 5/2001 | Shih et al. | 426/94 |
| 6,287,622 B1 | 9/2001 | Villagran | |
| 6,352,730 B1 | 3/2002 | Zimmerman | |
| 6,432,465 B1 | 8/2002 | Villagran | |
| 6,479,089 B2 | 11/2002 | Cohen | |
| 6,558,730 B1 | 5/2003 | Gizaw | |
| 7,189,424 B2 | 3/2007 | Gorski | |
| 2002/0025367 A1* | 2/2002 | Koehler et al. | 426/549 |
| 2002/0160092 A1 | 10/2002 | Villagran | |
| 2003/0185957 A1* | 10/2003 | Gorski | 426/560 |
| 2005/0053715 A1 | 3/2005 | Villagran et al. | |
| 2005/0153015 A1 | 7/2005 | Inoue et al. | |

FOREIGN PATENT DOCUMENTS

| | | |
|---|---|---|
| EP | 0 738 473 A2 | 10/1996 |
| GB | 1 465 843 A1 | 3/1977 |
| JP | H110146762 | 6/1999 |
| WO | WO 96/01572 A1 | 1/1996 |
| WO | WO 99/03356 A1 | 1/1999 |
| WO | WO 99/51111 A1 | 10/1999 |

OTHER PUBLICATIONS

J.A. Fondevila, "Development and Characterization of a Snack Food Product Using Broken Rice Flour", Journal of Food Science, 1988, 53 (2), pp. 488-489.
D.D. Duxbury, "Rice Chip Mixes Solve Texture Problems", Food Processing, 1993, 54 (5), p. 81.
M. H. Lee, et al.; "Physicochemical Properties of Calcium-Fortified Rice"; Cereal Chemistry, Vole 72 1995, pp. 352-355.
S. Parlin; "Rice Flour Makes its Mark"; Food Processing Solutions; vol. 58, 1997, p. 60.
R. S. Kadan et al.; article—"Functional Properties of Extruded Rice Flours"—Journal of Food Science; Food Chemistry & Technology—4 pgs.
PCT International Search Report Dated Nov. 16, 2006—5 pgs.

* cited by examiner

*Primary Examiner* — Elizabeth Gwartney
(74) *Attorney, Agent, or Firm* — Dickinson Wright PLLC

(57) ABSTRACT

A rice flour composition having: from about 20% to about 95%, by weight, of a rice flour that has a WAI of from about 2.6 to about 9; and a Peak Viscosity from about 4 RVU to about 130 RVU; and from about 5% to about 80%, by weight, of rice starch materials that have a WAI of below about 2.2; a Peak Viscosity from about 100 RVU to about 900 RVU, and a soluble amylose content of less than 10%, by weight. The rice starch materials can be selected from the group consisting of waxy rice starch, acetylated rice starch, cross linked rice starch and mixtures thereof. The compositions can be used to produce food products such as fabricated sheeted snacks, extruded products, sauces, coatings for fried foods, dog foods, dog biscuits, baby foods and breads. The preferred dough formed from the inventive rice flour composition is sheetable and forms a cohesive dough. Fabricated snacks made from this dough has the desired taste and texture characteristics. A dry blend for a preferred fabricated snack comprises from about 2% to about 100%, preferably from about 20% to about 85%, most preferably from about 40% to about 75%, of the rice flour composition.

14 Claims, No Drawings

RICE FLOUR COMPOSITIONS

CROSS REFERENCE TO RELATED APPLICATION

This application claims the benefit of priority to U.S. Provisional Application Ser. No. 60/687,965, filed Jun. 7, 2005 which is herein incorporated by reference.

FIELD OF THE INVENTION

The present invention relates to rice flour compositions and to food products comprising rice flour compositions, especially fabricated snack products comprising rice flour compositions.

BACKGROUND OF THE INVENTION

Fabricated snack products prepared from doughs comprising starch-based materials are well-known in the art. These doughs typically comprise dehydrated potato products such as dehydrated potato flakes, granules, and/or flanules. The doughs can also comprise a number of other starch-based ingredients, such as wheat, corn, rice, tapioca, barley, cassava, oat, sago, and potato starches, as well as flours. These other starch-based ingredients are typically included in the doughs in lesser quantities than the dehydrated potato products.

The advantages of preparing such food products, for example, potato snacks, from a dough rather than from sliced, whole potatoes include homogeneity or uniformity in the end food products and the ability to more closely control the separate steps involved in the preparation of the food products. Additionally, preparing fabricated snack products from dough provides the flexibility to formulate such products according to the availability of raw materials and to consumer desires for various textures and flavors.

Rice flour is a material that is available globally. Its characteristic flavor, which can be described as clean and neutral makes it suitable for use in corn, potato, rice and other snacks. Furthermore, rice flour is suitable for use as the primary ingredient for making both low intensity flavored snacks, such as herbal flavors or sweet flavors, as well as high-intensity flavored seasoned snacks. This is possible because the rice flour's neutral flavor does not compete with that of the seasoning.

Although rice flour can be included in fabricated snack doughs, its inclusion can lead to processing and product quality issues which are not easily solved. For example, the addition of rice flour can result in inelastic doughs that are difficult to cook, dry, or fry. Furthermore, the fabricated snack products resulting from these doughs can be too soft, with a cracker-like texture and an undesirable raw taste, or too hard and dense. This is, in part, caused by the difficulty in cooking rice flour, as rice starch has one of the highest gelatinization temperatures among the starches (72° C.) available for use in snacks. That is, such high gelatinization temperatures prevent the starch in rice flour from being cooked completely to avoid a raw taste and 'tooth packing' of the resulting products.

There are substantial benefits to increasing the amount of rice flour in fried snack products. It has surprisingly been found that dough based on rice flour absorbs less fat upon frying than dough based on potato and other flours. This benefit, however, is not necessarily proportional to the amount of rice flour used. Likewise, in most areas of the world, rice flour is more readily available, and less expensive than potato flour. It has also been found that a blend of rice flours with specific functionality can absorb significantly lower water content during the dough making process, which in turn reduces the finished product fat content. Also, it has been found that specific chemical modifications of rice starch have a unique functionality in snack formulations, providing additional product crispiness and facilitating the dough-making process. These advantages make rice ingredients a desirable raw material for the manufacture of snacks.

But as the concentration of standard rice flour in the dough increases, the processing problems associated with rice flour also increase dramatically. Processing issues include weak and dry dough that requires high water levels to process. Increasing the water content of the dough can increase the fat content of the final product. Adding 10-20%, by weight, of standard rice flour to potato flour based dough, requires a certain degree of process manipulation to make an acceptable snack product. But if the rice flour is increased to, for example, 70-90%, by weight, the processing problems are drastically increased, and it is very difficult to reduce the water required to form the dough. And if standard rice flour is used in such high quantities, the resulting snack product has a substantially dense texture and poor mouth feel when compared to a potato based snack. More specifically, potato based snack products have a fast melt down which yields a light and crispy texture, whereas rice based snack products have either a slower melt down with a glassy, hard texture such as found in Japanese crackers, or a soft, chewy and tooth packing texture such as found in rice cakes. Consumers have grown accustomed to the crispy texture and eating quality of potato, corn, and wheat based snacks, and breaking from that established equity is difficult.

There are other rice snacks currently available such as extruded rice based snacks. While these commercially available products enjoy some consumer acceptance, they are still not substitutes for, nor do they provide a crispy, crunchy and light texture comparable to that found in potato chips.

Hence, there exists a need for formulae and processes for making fabricated snack products with relatively high concentrations of rice flour, while maintaining certain textural qualities that consumers prefer. And there is a need for a dough made from a rice flour composition that has a significantly lower water content. And there is a need for a rice crisp product that is made from a sheet of dough or extruded, and then fried, partially fried and then baked, or baked.

There exists also a need for formulae and processes for making snacks with relatively high rice levels with lower fat content, but with the texture and taste of full fat snacks.

This and other advantages of the invention will become apparent from the following disclosure.

SUMMARY OF THE INVENTION

The present invention provides rice flour compositions that are suitable for use in making fabricated snack products. The rice flour compositions, when used in fabricated snack doughs, result in cohesive doughs having the desired level of elasticity and in finished fabricated snack products having the desired organoleptic properties.

In one aspect of the present invention there is provided a rice flour composition having from about 20% to about 95%, by weight, of a rice flour that has a WAI of from about 2.6 to about 9; and a Peak Viscosity from about 4 RVU to about 130 RVU. The rice flour composition further contains from about 5% to about 80%, by weight, of rice starch materials that have a WAI of below about 2.2; a Peak Viscosity from about 100 RVU to about 900 RVU, and a soluble amylose content of less than 10%, preferably less than about 8%, and even more preferably, less than about 6%, by weight. The rice starch materials are preferably selected from the group consisting of waxy rice flour, acetylated rice starch, other cross linked rice starch and mixtures thereof. The rice flour is preferably selected from the group consisting of medium grain rice flour, long grain rice flour, and mixtures thereof.

In yet another aspect of the present invention, there is provided a dry blend for making a fabricated snack product. The dry blend comprises from about 2% to about 100% of the rice flour compositions, preferably from about 15% to about 100% of a rice flour composition, and more preferably from about 25% to about 85% of a rice flour composition. The dry blend can be used, for example, for making dough which is rolled into sheets that have a sheet strength of from about 200 to about 600 gf. The dry blend comprising the rice flour composition of the present invention and other ingredients, has a WAI ranging from about 3 to about 7, preferably from about 3.5 to about 6, and more preferably from about 4 to about 6. In one embodiment it is preferred that the dry blend has a Peak Viscosity ranging from about 70 RVU to about 120 RVU, preferably from about 75 RVU to about 100 RVU and more preferably from about 80 RVU to about 90 RVU. In another embodiment herein the preferred dry blend has a Final Viscosity ranging from about 90 RVU to about 150 RVU, preferably from about 100 RVU to about 125 RVU, and more preferably from about 100 RVU to about 115 RVU.

The rice flour composition can also be used to produce food products such as extruded products, baked snacks, tortilla based snacks, sauces, coatings for foods, dog foods, dog biscuits, baby foods and breads.

As discussed above, there are both financial and nutritional reasons for using the rice compositions of the present invention. Specifically, rice flour is generally less expensive than potato flour and it absorbs less fat when fried. But making dough, fabricated snack products, and fried chips that contain a large percentage of rice flour presents certain processing and formulation difficulties. These difficulties are largely overcome by the addition of the rice starch materials of the present invention.

DETAILED DESCRIPTION OF THE INVENTION

A. Definitions

As used herein "broken pieces of rice" refers to kernels of rice that are less than three-fourths of the whole kernel.

As used herein "gelatinized" includes any type of gelatinization including fully gelatinized, partially gelatinized, and pregelatinized starches. Gelatinized rice flours can include, but are not limited to, parboil, cooked, partially cooked, and extruded rice flours.

As used herein, "rice" includes any varieties or types of rice including, but not limited to, white, brown, black and wild. "Rice" also includes any rice with any natural or enhanced nutritional content.

As used herein, "extruded rice" refers to rice that has been passed through an extruder.

As used herein "cooked rice" refers to rice that has been parboiled or otherwise cooked or partially cooked before or after grinding into flour.

As used herein "parboiled rice" refers to rice that has gone through a cooking process prior to hull removal.

As used herein "uncooked rice" refers to rice that has not been cooked in any manner.

As used herein "short grain rice" refers to rice that has a short, plump, round-like kernel having a length ranging from about 1 to about 2 times the width, and having a total amylose content ranging from about 0% to about 13%.

As used herein "medium grain rice" refers to rice that has a length ranging from about 2 to about 3 times the width and having an amylose content ranging from about 14% to about 19%.

As used herein "long grain rice" refers to rice that has a long, slender kernel having a length ranging from about 3.5 to about 5 times the width, and having a total amylose content ranging from about 20% to about 25%.

As used herein, the term "fabricated" refers to food products made from doughs comprising flour, meal, and/or starch, such as those derived from tubers, grains, legumes, cereals, or mixtures thereof.

As used herein, "native starch" refers to starch that has not been pre-treated or cooked in any way, and includes but is not limited to hybrid starches.

As used herein, "dehydrated potato products" includes, but is not limited to, potato flakes, potato flanules, potato granules, potato agglomerates, any other dehydrated potato material, and mixtures thereof.

As used herein, "sheetable dough" is a cohesive dough capable of being placed on a smooth surface and rolled to the desired final thickness without tearing or forming holes. Sheetable dough can also include dough that is capable of being formed into a sheet through an extrusion process.

As used herein, "starch" refers to a native or an unmodified carbohydrate polymer having repeating anhydroglucose units derived from materials such as, but not limited to, wheat, corn, tapioca, sago, rice, potato, oat, barley, and amaranth, and also refers to modified starch including but not limited to hydrolyzed starches such as maltodextrins, high amylose corn maize, high amylopectin corn maize, pure amylose, chemically substituted starches, crosslinked starches, and other modifications including but not limited to chemical, physical, thermal or enzymatic and mixtures thereof. It is understood that the materials described below as "rice starch materials" do not fall within the definition of "Starch" as defined herein.

As used herein, "starch-based flour" refers to high polymeric carbohydrates composed of glucopyranose units, in either natural, dehydrated (e.g., flakes, granules, meal) or flour form. Starch-based flour can include, but is not limited to, potato flour, potato granules, potato flanules, potato flakes, corn flour, masa corn flour, corn grits, corn meal, rice flour, buckwheat flour, oat flour, bean flour, barley flour, tapioca, and mixtures thereof. For example, the starch-based flour can be derived from tubers, legumes, grain, or mixtures thereof.

As used herein, "rice starch materials" refers to rice starch that: has different characteristics than standard rice flour; or has been altered to improve its functional characteristics. Suitable rice starch materials include, but are not limited to, pregelatinized starches, waxy rice starch, waxy rice flour, low viscosity starches (e.g., dextrins, acid-modified starches, oxidized starches, enzyme modified starches), stabilized starches (e.g., starch esters, starch ethers), cross-linked starches, acetylated starches, starch sugars (e.g. glucose syrup, dextrose, isoglucose) and starches that have received a combination of treatments (e.g., cross-linking and gelatinization) and mixtures thereof.

As used herein the term "added water" refers to water that has been added to the dry dough ingredients. Water that is inherently present in the dry dough ingredients, such as in the case of the sources of flours and starches, is not included in the "added water."

As used herein the term "emulsifier" refers to emulsifier that has been added to the dough ingredients. Emulsifiers that are inherently present in the dough ingredients, such as in the case of the potato flakes (where emulsifier is used as a processing aid during manufacturing), are not included in the term "emulsifier."

As used herein "rapid viscosity unit" (RVU) is an arbitrary unit of viscosity measurement roughly corresponding to centipoise, as measured using the RVA analytical method herein. (12 RVU equal approximately 1 centiPoise)

The terms "fat" and "oil" are used interchangeably herein unless otherwise specified. The terms "fat" or "oil" refer to edible fatty substances in a general sense, including natural or synthetic fats and oils consisting essentially of triglycerides, such as, for example soybean oil, corn oil, cottonseed oil, sunflower oil, palm oil, coconut oil, canola oil, fish oil, lard and tallow, which may have been partially or completely hydrogenated or modified otherwise, as well as non-toxic fatty materials having properties similar to triglycerides, herein referred to as non-digestible fats, which materials may be partially or fully indigestible. Reduced calorie fats and edible non-digestible fats, oils or fat substitutes are also included in the term.

The term "non-digestible fat" refers to those edible fatty materials that are partially or totally indigestible, e.g., polyol fatty acid polyesters, such as OLEAN™. The preferred non-digestible fats are fatty materials having properties similar to triglycerides, such as sucrose polyesters. These preferred non-digestible fats are described in U.S. Pat. No. 5,085,884, issued Feb. 4, 1992 to Young et al. and U.S. Pat. No. 5,422, 131, issued Jun. 6, 1995 to Elsen et al. An especially preferred brand of non-digestible fats is sold under the tradename OLEAN™.

By the term "dry blend" it is meant herein the dry raw material mixed together prior to processing of the materials so mixed.

All percentages are by weight unless otherwise specified.

All documents cited herein are, in relevant part, incorporated by reference; the citation of any document is not to be construed as an admission that it is prior art with respect to the present invention.

B. Rice Flour Compositions

In one aspect of the present invention there is provided a rice flour composition having from about 20% to about 95%, by weight, of a rice flour that has a WAI of from about 2.6 to about 9; and a Peak Viscosity from about 4 RVU to about 130 RVU. The rice flour composition further contains from about 5% to about 80%, by weight, of rice starch materials that have a WAI of below about 2.2; a Peak Viscosity from about 100 RVU to about 900 RVU. The rice starch-based materials are preferably selected from the group consisting of waxy rice starch or flour, acetylated rice starch, cross linked rice starch and mixtures thereof. The rice flour is preferably selected from the group consisting of medium grain rice flour, long grain rice flour, and mixtures thereof.

Furthermore, the rice flour composition has a peak viscosity of from about 135 to about 250 RVU, preferably from about 150 to about 220 RVU, and more preferably from about 175 to about 210 RVU. The rice flour composition also has a final viscosity from about 140 RVU to about 350 RVU, and preferably from about 170 RVU to about 330 RVU, and most preferably from about 190 RVU to about 300 RVU. The rice flour composition has a Water Absorption Index from about 2 to about 5, preferably from about 2.5 to about 4.5, and more preferably from about 3 to about 4.

The rice starch materials are processing and formulation additives that provide a better dough, resulting in a superior sheeted product from which the fabricated snack piece can be made. And importantly, a chip product made by frying the fabricated snack piece has superior attributes. The rice starch materials include, but are not limited to, pregelatinized starches, low viscosity starches (e.g., dextrins, acid-modified starches, oxidized starches, enzyme modified starches), stabilized starches (e.g., starch esters, starch ethers), waxy rice starch or flour, cross-linked starches, acetylated starches, starch sugars (e.g. glucose syrup, dextrose, isoglucose) and starches that have received a combination of treatments (e.g., cross-linking and gelatinization) and mixtures thereof. Preferably the rice starch materials have a total amylose content less than 10%, more preferably less than 5%. Those skilled in the art will appreciate that the rice starch materials described herein are commercially available, for example, from Remy Industries N.V., Remylaan 4, B-3018 Leuven-Wijgmaal, Belgium.

In addition to the rice starch materials of the present invention, conventional rice flour is used as well. Long grain, medium grain, short grain and sweet or grain rice can all be made into rice flour. In addition, rice flour can be made from broken pieces or whole pieces of rice. Rice flours made from these different types of rice vary in water absorption index, peak viscosity, final viscosity, and total amylose content. Furthermore, if the rice is partially or fully pre-cooked, par-boiled, or pre-gelatinized in any other way prior to, or after, processing into rice flour, the rice flour properties can be further modified.

The present invention provides rice flour compositions that are suitable for use in making fabricated snack products. The rice flour compositions, when used in fabricated snack doughs, result in cohesive doughs having the desired level of elasticity and finished fabricated snack products having the desired organoleptic properties.

In a preferred embodiment, the composition comprises long grain rice flour, medium grain rice flour, or combinations thereof. Furthermore, the composition can comprise rice flour that is partially or fully gelatinized. For example, the rice flour can be gelatinized, partially gelatinized, partially pre-cooked, pre-cooked, par-boiled, extruded, or combinations thereof in order to effect the desired starch degradation in the rice flour.

Mixing together the desired quantities of various rice flours can be used to make the desired rice flour composition. This can be accomplished by any suitable means such as, but not limited to, mixing the rice grains before milling, or mixing the flours together after milling.

In a preferred embodiment, gelatinized rice flour is used. In this embodiment, the composition can comprise a blend of one or more rice flours that have been gelatinized to varying degrees. For example, the gelatinized rice flour can comprise fully cooked rice, partially cooked rice, parboiled rice, extruded rice, or mixtures thereof. The fully cooked gelatinized rice flour is from about 75% to about 100% gelatinized, the partially cooked rice flour and the extruded rice flour is from about 25% to about 100% gelatinized, and the parboiled rice flour is from about 75% to about 100% gelatinized.

In a preferred embodiment, acetylated rice starch is used as part of the rice starch materials. acetylated rice starch contains modified granules that contain substituents (i.e. acetyl groups) linked to starch molecules by covalent bonds. The introduction of these groups makes the granules more readily dispersible in water upon heating. This type of modified rice starch material also presents a lower gelatinization temperature (62° C. compared to 71° C.). This is important in processes where the residence time in the fryer is limited. This rice starch material also showed increased swelling and solubility, which facilitates hydration requiring less time mixing.

This modified starch enables the use of lower water content in the dough, which results in lower fat content. Further, this modified starch also increases crispiness and expansion in the product. The results is a low fat snack that delivers the texture and taste of a full fat snack.

In a preferred embodiment, waxy rice flours are used as part of the rice starch materials. These flours can be uncooked, partially or fully cooked.

Extrusion is the preferred method of processing the gelatinized rice flour for this invention. Extrusion provides the cooking conditions required for the starch of the rice flour to completely cook, resulting in complete gelatinization and high levels of dextrinization of the starch—i.e., starch degradation. The use of extrusion to prepare the rice flours for this invention guarantees the absence of a raw starch taste or the powdery starchy aftertaste and the uncontrolled and excessive expansion in the finished product.

In one embodiment, the gelatinized rice flour is selected from the group consisting of partially precooked long grain rice flour, fully cooked long grain rice flour, fully cooked medium grain rice flour, parboiled rice flour, and mixtures thereof. In another embodiment, the gelatinized rice flour is made from gelatinized broken, long grain rice pieces.

Optionally, emulsifier can be added to the gelatinized rice flour as a processing aide to complex the free amylose generated during cooking and/or milling. For example, monoglycerides can be added at a level ranging from about 0.2 to about 0.7%, and preferably from about 0.3% to about 0.5% (on a dry solids basis).

The rice flour can be ground to a wide range of particle size distribution. In a particular embodiment, the composition has a particle size distribution such that about 35% of the flour remains on a US #100 mesh. Preferably the rice flour composition has a particle size distribution wherein from about 5% to about 30% remains on a 60 mesh screen, from about 15% to about 50% remains on a 100 mesh screen, and from about 20% to about 60% remains on a 200 mesh screen. Particle size distribution of the rice flour is important to ensure proper hydration during mixing. Also, the particle size distribution has an effect on texture; large particles in the rice flour will contribute to slow melting and tooth packing.

The rice flour compositions can be used to make a dry blend used in the manufacture of food products, such as fabricated snacks. In one embodiment, the dry blend comprises from about 2% to about 100%, preferably from about 25% to about 77%, and more preferably from about 40% to about 95%, rice flour composition.

C. Fabricated Snack Product Preparations

Although the use of the rice flour compositions will be described primarily in terms of a preferred fabricated snack product, it should be readily apparent to one skilled in the art that the rice flour compositions of the present invention can be used in the production of any suitable food products. For instance, the rice flour compositions can be used to produce food products such as extruded products, breads, sauces, crackers, fried snacks, fruit and vegetable snacks, baked or dried snacks, coatings for fried foods, baby foods, dog foods, dog biscuits and any other suitable food product. The production of the preferred fabricated snack product is set forth in detail below.

1. Dough Formulation

The preferred doughs of the present invention comprise a dry blend and added water. Preferably, the doughs comprise from about 50% to about 85% dry blend and from about 15% to about 50% added water. The doughs can further comprise optional ingredients.

a. Dry Blend

Preferred doughs comprise from about 50% to about 85% dry blend, preferably from about 60% to about 75% dry blend.

The dry blend comprises the rice flour composition. Preferred dry blends comprise from about 2% to about 100%, preferably from about 20% to about 85%, and more preferably from about 40% to about 75% rice flour compositions with the balance being other ingredients, such as other starch materials such as starch or flour. Suitable sources of other starch material include tapioca, oat, wheat, rye, barley, corn, masa, cassena, non-masa corn, peanut, and dehydrated potato products (e.g., dehydrated potato flakes, potato granules, potato flanules, mashed potato materials, and dried potato products). These other starch materials can be blended to make snacks of different compositions, textures, and flavors. Furthermore, the balance of the dry blend can comprise one or more components including but not limited to, protein sources, fiber, minerals, vitamins, colorants, flavors, fruits, vegetables, seeds, herbs, spices In one embodiment, a preferred dry blend comprising the rice flour composition of the present invention and other ingredients, has a WAI ranging from about 3 to about 7, preferably from about 3.5 to about 6, and more preferably from about 4 to about 6. The lower water absorption of the dry blend corresponds to a lower fat product, however, the rice chip from this invention has the texture, lubricity, taste, and appearance of a full or high fat snack.

In one embodiment it is preferred that the dry blend has a Peak Viscosity ranging from about 70 RVU to about 120 RVU, preferably from about 75 RVU to about 100 RVU and more preferably from about 80 RVU to about 90 RVU. In another embodiment herein the preferred dry blend has a Final Viscosity ranging from about 90 RVU to about 150 RVU, preferably from about 100 RVU to about 125 RVU, and more preferably from about 100 RVU to about 115 RVU.

b. Added Water

Preferred dough compositions of the present invention comprise from about 15% to about 50% added water, preferably from about 20% to about 40%, and more preferably from about 20% to about 32% added water. If optional ingredients, such as maltodextrin or corn syrup solids, juices, concentrates, are added as a solution or syrup, the water in the syrup or solution is included as added water. The amount of added water also includes any water used to dissolve or disperse ingredients.

c. Optional Ingredients

Any suitable optional ingredient may be added to the doughs of the present invention. Such optional ingredients can include, but are not limited to, gum, reducing sugar, emulsifier, and mixtures thereof. Optional ingredients are preferably included at a level ranging from about 0% to about 50%, preferably, 0% to about 40%, by weight in the dough. Examples of suitable gums can be found in U.S. Pat. No. 6,558,730, issued May 6, 2003, to Gizaw et al.

Optionally, reducing sugar can be added to the dough. While the reducing sugar content can be dependent upon that of the potatoes that were employed to prepare the dehydrated potato product, the amount of reducing sugar in the fabricated snack products can be controlled by adding suitable amounts of a reducing sugar such as maltose, lactose, dextrose, or mixtures thereof to the dough. The dry blend of the present invention may contain from 0% to about 20%, preferably from 0% to about 10%, and even more preferably from 0% to about 7.5%, by weight, maltodextrin.

An ingredient that can optionally be added to the dough to aid in its processability is emulsifier. An emulsifier is preferably added to the dough composition prior to sheeting the dough. The emulsifier can be dissolved in a fat or in a polyol fatty acid polyester such as Olean™. Suitable emulsifiers include lecithin, mono- and diglycerides, diacetyl tartaric acid esters and propylene glycol mono- and diesters and polyglcerol esters. Polyglycerol emulsifiers such as monoesters of hexaglycerols, can be used. Particularly preferred monoglycerides are sold under the trade names of Dimodan available form Danisco®, New Century, Kans. and DMG 70, available from Archer Daniels Midlands Company, Decatur, Ill.

When calculating the level of optional ingredients according to the present invention, that level of optional ingredient which may be inherent in the rice flour and dehydrated potato products is not included. For example, rice starch materials that is inherent in the rice flour is not included. The level of rice starch materials is that which is added over and above that level inherently present in the rice flour.

2. Dough Preparation

The doughs of the present invention can be prepared by any suitable method for forming sheetable doughs. Typically, a loose, dry dough is prepared by thoroughly mixing together the ingredients using conventional mixers. Preferably, a pre-blend of the wet ingredients and a pre-blend of the dry ingredients are prepared; the wet pre-blend and the dry pre-blend are then mixed together to form the dough. Hobart® mixers are preferred for batch operations and Turbulizer® mixers are preferred for continuous mixing operations. Alternatively, extruders can be used to mix the dough and to form sheets or shaped pieces.

a. Sheeting

Once prepared, the dough is then formed into a relatively flat, thin sheet. Any method suitable for forming such sheets from starch-based doughs can be used. For example, the sheet can be rolled out between two counter rotating cylindrical rollers to obtain a uniform, relatively thin sheet of dough material. Any conventional sheeting, milling and gauging equipment can be used. The mill rolls should preferably be heated to from about 90° F. (32° C.) to about 135° F. (57° C.). In a preferred embodiment, the mill rolls are kept at two different temperatures, with the front roller being hotter than the back roller. The dough can also be formed into a sheet by extrusion.

Doughs of the present invention are usually formed into a sheet having a thickness ranging from about 0.015 to about 0.10 inches (from about 0.038 to about 0.25 cm), and preferably to a thickness ranging from about 0.019 to about 0.05 inches (from about 0.048 to about 0.127 cm), and most preferably from about 0.02 inches to about 0.03 inches (0.051 to 0.076 cm).

Dough sheets of the present invention have a sheet strength of from about 180 gf to about 600 gf, preferably from about 200 gf to about 450 gf, and more preferably from about 250 gf to about 350 gf. Moreover, the dough of the present invention is very strong even when sheeted to very low thickness. Because of this high sheet strength, the present rice flour composition is an excellent carrier for food pieces in the dough, for example, pieces of fruit, vegetables, whole grains, nuts and the like.

The dough sheet is then formed into snack pieces of a predetermined size and shape. The snack pieces can be formed using any suitable stamping or cutting equipment. The snack pieces can be formed into a variety of shapes. For example, the snack pieces can be in the shape of ovals, squares, circles, a bowtie, a star wheel, or a pinwheel. The pieces can be scored to make rippled chips as described by Dawes et al. in PCT Application No. PCT/US95/07610, published Jan. 25, 1996 as WO 96/01572.

b. Cooking

After the snack pieces are formed, they are cooked until crisp to form fabricated snack products. The snack pieces can be fried, for example, in a fat composition comprising digestible fat, non-digestible fat, or mixtures thereof. For best results, clean frying oil should be used. The free fatty acid content of the oil should preferably be maintained at less than about 1%, more preferably less than about 0.3%, in order to reduce the oil oxidation rate. Any other method of cooking or drying the dough, such as high temperature extrusion, baking, microwave heating, or combination is also acceptable.

In a preferred embodiment of the present invention, the frying oil has less than about 30% saturated fat, preferably less than about 25%, and most preferably, less than about 20%. This type of oil improves the lubricity of the finished fabricated snack products such that the finished fabricated snack products have an enhanced flavor display. The flavor profile of these oils also enhance the flavor profile of topically seasoned products because of the oils' lower melting point. Examples of such oils include sunflower oil containing medium to high levels of oleic acid.

In another embodiment of the present invention, the snack pieces are fried in a blend of non-digestible fat and digestible fat. Preferably, the blend comprises from about 20% to about 90% non-digestible fat and from about 10% to about 80% digestible fat, more preferably from about 50% to about 90% non-digestible fat and from about 10% to about 50% digestible fat, and still more preferably from about 70% to about 85% non-digestible fat and from about 15% to about 30% digestible fat. Other ingredients known in the art can also be added to the edible fats and oils, including antioxidants such as TBHQ, tocopherols, ascorbic acid, chelating agents such as citric acid, and anti-foaming agents such as dimethylpolysiloxane.

It is preferred to fry the snack pieces at temperatures of from about 275° F. (135° C.) to about 420° F. (215° C.), preferably from about 300° F. (149° C.) to about 410° F. (210° C.), and more preferably from about 350° F. (177° C.) to about 400° F. (204° C.) for a time sufficient to form a product having about 6% or less moisture, preferably from about 0.5% to about 4%, and more preferably from about 1% to about 3% moisture. The exact frying time is controlled by the temperature of the frying fat and the starting water content of the dough, which can be easily determined by one skilled in the art.

Preferably, the snack pieces are fried in oil using a continuous frying method and are constrained during frying. This constrained frying method and apparatus is described in U.S. Pat. No. 3,626,466 issued Dec. 7, 1971 to Liepa. The shaped, constrained snack pieces are passed through the frying medium until they are fried to a crisp state with a final moisture content of from about 0.5% to about 4%, preferably from about 1% to about 2.5%.

Any other method of frying, such as continuous frying or batch frying of the snack pieces in a non-constrained mode, is also acceptable. For example, the snack pieces can be immersed in the frying fat on a moving belt or basket. Likewise, frying can occur in a semi-constrained process. For example, the fabricated snack pieces can be held between two belts while being fried in oil.

Oils with characteristic flavor or highly unsaturated oils can be sprayed, tumbled or otherwise applied onto the fabricated snack products after frying. Preferably triglyceride oils and non-digestible fats are used as a carrier to disperse flavors and are added topically to the fabricated snack products. These include, but are not limited to, butter flavored oils, natural or artificial flavored oils, herb oils, and oils with potato, garlic, or onion flavors added. This allows the introduction of a variety of flavors without having the flavor undergo browning reactions during the frying. This method can be used to introduce oils which would ordinarily undergo polymerization or oxidation during the heating necessary to fry the snacks.

The finished products from this invention have a lighter and crispier texture than typical potato snacks due to the rice flour added into the formula. The rice flour is responsible for creating a light texture with a controlled expansion, which means a chip surface without the presence of external bubbles and only with small and internal bubbles. These internal bubbles decrease the density of the chip compared to potato crisps. The fat content of the finished chip of this invention ranges from about 0 grams to about 11 grams per a 28 gram serving of chips. Preferably the fat content of the chip is less than about 5 g of fat per a 28 gram serving of chips This represents approximately 20 to 50% reduction in the fat content when compared to a chip processed under similar conditions but comprising potato flour, which is typically of 11 g per 28 g serving.

D. Product Characteristics and Analytical Methods

1. Water Absorption Index (WAI)
   a. Dry Ingredients and Flour Blend:

In general, the terms "Water Absorption Index" and "WAI" refer to the measurement of the water-holding capacity of a carbohydrate based material as a result of a cooking process. (See e.g. R. A. Anderson et al., *Gelatinization of Corn Grits By Roll- and Extrusion-Cooking*, 14(1):4 CEREAL SCIENCE TODAY (1969).) WAI of the chip describes how much water will take the chip to melt/dissolve, which is also an indirect measurement of the texture of the chip and eating quality. In this application, the snack has a low WAI, which correlates with the light texture and fast melt down.

Measuring WAI for Finished Product
1. Grind 10 grams of the sample of finished product using a Cuisinart (Mini-Mate), to reduce the particle size of the sample.
2. Sieve the ground sample through a US#20 sieve and weight 2 grams of this ground sample.

Follow the same steps from the method from sample preparation, hydration, measuring supernate, including calculations as for dry materials.

References
American Association of Cereal Chemists, Eighth Edition, Method 56I-20, "Hydration Capacity of Pregelatinized Cereal Products" First approval 4-4-68. Reviewed 10-27-82.

Principle
A sample with a fine particle size is hydrated and centrifuged so that the gelled portion separates from the liquid. The liquid containing the soluble starch is poured off, the gelled portion is weighed and expressed as an index of gel weight to original sample weight.

Scope
This test method covers the measurement of water retention of pregelatinized starches and cereal products that contain pregelatinized starches. It is intended to give a measurement of the amount of water which cannot be removed from thoroughly wetted samples solely by mechanical means as applied by centrifugal force.

Equipment/Reagents/Apparatus
Centrifuge ALC (Apparecchi per Laboratori Chimici), model 4235 DiRuscio Associates, Manchester, Mo. Vel Laboratory Supplies, Louvain, Belgium

| | |
|---|---|
| 45° Fixed Angle Rotor | ALC, catalog number 5233 (6 sample holder) |
| Tube Carriers | ALC, catalog number 5011 (6 needed) |
| Tube Adapter | ALC, catalog number 5721 (6 needed) |
| Centrifuge tubes | VWR Cat. No.: 21010-818 (50 mL round bottom polypropylene tube, 105 mm x 28.5 mm) |
| Balance | Accurate to ±0.01 g |
| Water bath | Must maintain constant temperature of 30° C. (±1.0) |
| Thermometer | VWR Cat. No. 71740-188 |
| Small metal spatula | VWR Cat. No. 57949-022 |
| Polyethylene wash bottle | VWR Cat. No. 16651-987 |
| Test Tube Rack | VWR Cat. No. 60917-512 |
| Beaker | VWR Cat. No. 13910-201 (250 mL) |
| Timer | VWR Cat. No. 62344-586 |
| Water | Distilled and deionized |

Procedure
Sample Preparation:
(Note: The centrifuge is capable of analyzing a maximum of 6 samples simultaneously. This maximum sample load represents 3 analyses performed in duplicate.)
1. Shake the sample until it is homogeneous.
2. Using a felt tip marker, draw a horizontal line 18 mm below the top edge of each centrifuge tube.
3. Using a felt tip marker, label a desired number of clean, dry 50 mL centrifuge tubes.
4. Record the number and weight of the centrifuge tubes to the nearest 0.01 decimal place. (Note: Use centrifuge tubes that are approximately the same weight.)
5. Weigh 2±0.05 g of the raw material into the labeled centrifuge tube.
6. Record the weight of the added sample.
7. Analyze each sample in duplicate.
8. Repeat Steps 4-7 for each sample.

Sample Hydration:
1. Add 30 mL of 30° C. distilled water to each centrifuge tube.
2. Using a small metal spatula, gently stir the mixture 30 times to homogeneously hydrate the sample. (CAUTION: Vigorous stirring will cause spillage, and the sample must be repeated.)
3. Before removing the stir rod, rinse it with 30° C. distilled water to minimize the amount of sample removed. Also, adequately rinse the side walls of the test tubes.
4. Repeat steps 2-3 for each sample.
5. Place the centrifuge tubes (6 maximum) into a 30° C. (86° F.±2°) distilled water bath for 30 minutes. Repeat the stirring procedure at 10, 20 and 30 minute intervals as described below:

| Stirring Frequency | |
|---|---|
| Time | Number of stirs |
| Beginning of analysis | 30 |
| After 10 minutes | 20 |
| After 20 minutes | 15 |
| After 30 minutes | 10 |

6. After heating samples for 30 minutes, remove the centrifuge tubes from the water bath. Dry each tube with a paper towel and insert them into a test tube rack.

7. Add water to the fill line.

Centrifugation:

1. Use the following equation to calculate the angular speed (RPM) required to produce a gravitational force F=1257 g:

$$n=(1.125\times10^9 \div r)^{1/2}$$

n=rpm r=radial distance from the center of rotation to the end of the sample tube (mm)

Example:

$$n=(1.125\times10^9 \div 115)^{1/2}$$

$$n=3127\approx 3130 \text{ RMP}$$

NOTE: The calculated RPM should be used as a starting point to verify the instrument. Using a well characterized raw material and data from a verified instrument, the RPM may require further adjustment to provide the same results as a previously verified centrifuge.

2. Adjust the RPM setting to the calculated angular speed.
3. Transfer the tubes to the centrifuge. (Note: An even number of samples must be analyzed to balance the sample load.)
4. Centrifuge the tubes for 15 minutes at the calculated angular speed.
5. After 15 minutes, allow centrifuge to coast to a complete stop. (CAUTION: Braking the centrifuge will lead to erroneous results.)

Measuring the Supernate:

1. Immediately remove the centrifuge tubes from the centrifuge and quickly decant the supernatant from each tube.

Caution

This is the most important step of the analysis.

If the gel pellet is inadvertently disturbed or removed, the analysis must be repeated.

2. Accurately weigh and record the weight of the tube and contents to ±0.01.

Calculations $$\text{Water absorption index}(WAI) = \frac{(\text{weight of gel} + \text{weight of tube}) - \text{weight of tube}}{\text{sample weight}}$$

Each mass is measured by ±0.01 g. Record each WAI value, the average of the triplicate sample, and the standard deviation.

2. Rheological Properties Using the Rapid Visco Analyzer (RVA)

References

Applications Manual for the Rapid Visco Analyser, Version 1, Newport Scientific, 1998.

American Association of Cereal Chemists (AACC), 1995. Determination of the pasting properties of rice with the Rapid Visco-Analyser. AACC Method 61-02, First Approval 10-26-94, Approved Methods of Analysis, 9th Edition, Amer. Assoc. Cereal. Chem., St. Paul Minn.

Principle

The Rapid Visco Analyzer (RVA) measures the viscosity profile of a sample undergoing a thermal cycle. As the temperature of a granular starch sample such as Masa increases, the granules absorb water and swell to many times their original size. Swelling of the starch is accompanied by an increase in the sample viscosity. The viscosity behavior as a function of temperature is characteristic of the material and often correlates with the starch's degree of cook.

A sample of known moisture level is mixed in water and the viscosity profile is measured as a function of a temperature program. The output of the RVA is a viscosity-time curve. The RVA results for peak viscosity, final viscosity, and pasting temperature are recorded for each sample. Samples must be analyzed in duplicate and the results averaged.

| Equipment | |
|---|---|
| RVA, Newport Scientific | RVA model 4, Foss North America, Part #0000ARVA40, Software version 2.2 |
| RVA canisters and paddles | Foss North America, Part #8100691 |
| Distilled water | |
| Small spatula | VWR Cat. No. 57952-253 or equivalent |
| Pipets | VWR Cat. No. 14670-205 or equivalent |
| Balance | Two place balance or equivalent |
| Cork, number 8 or larger | VWR Cat. No. 59580-342 or equivalent |
| Weigh paper | VWR Cat. No. 12578-165 or equivalent |

RVA Conditions

The RVA temperature profile is as follows:

| PROFILE | | |
|---|---|---|
| Time | Type | Value |
| 00:00:00 | Temp | 50° C. |
| 00:00:00 | Speed | 960 rpm |
| 00:00:10 | Speed | 160 rpm |
| 00:01:00 | Temp | 50° C. |
| 00:04:42 | Temp | 95° C. |
| 00:07:12 | Temp | 95° C. |
| 00:11:00 | Temp | 50° C. |
| 00:13:00 | End Temp | 50° C. |

Sample Weight Determination

Sample and water weights should be corrected for the sample moisture content to give a constant dry weight. The sample moisture content must be determined by either Oven Moisture Standard Method or Mettler Moisture Method (10 g, 120° C., 10 minutes).

The following formulas are used to determine the corrected sample mass (S) and correct water mass (W) for each sample.

$$S = \frac{28*C}{(100-M)}$$

$$W = 28 - S$$

where S=corrected starch weight (g)

C=dry starch concentration (%)

M=actual moisture content of the starch (%)

W=corrected water weight (g)

Use these formulae to determine the amount of sample (S) and water (W) to weigh for the analysis.

Sample Preparation

1. Determine the amount of water (W) and sample (S) needed to run the analysis using the Sample Weight Determination section above.
2. Weigh the desired amount of water in a clean canister to the nearest 0.01 g.
3. Mix the sample to ensure homogeneity. Weigh the desired amount of sample on a weigh paper to the nearest 0.01 g. (Note. It is critical that the correct amount of sample to be weighed to minimize method error.)
4. Carefully pour the sample into the canister leaving no sample remaining on the weigh paper. Once the sample enters the water, the analysis must be performed within 40 seconds.
5. Place a clean, dry cork over the canister and shake vigorously by hand for 10 seconds.
6. Carefully slide stopper off canister and transfer all sample and water from the cork into the canister and then quickly scrape sample down canister walls with paddle blade. (Note: It is critical that all of the sample be transferred into the canister to minimize method error.)
7. Place paddle in the canister, fix paddle on RVA, center base of canister over heating chamber, and lower tower to start the test.
8. After the analysis, the tower will pop up. Press "Yes" to add this test to the Current Analysis Session. Remove the paddle and canister and discard. Note: the RVA canisters and paddle may only be used up to three times if thoroughly washed and dried between uses.
9. To run the next sample, repeat this process starting with step 4 under RVA preparation.

Data Analysis

From the graph of paste viscosity versus time read the maximum viscosity obtained during the heating and holding cycles of the Standard Profile (standard method). The maximum viscosity is the sample Peak Viscosity.

From the graph of paste viscosity versus time read the viscosity obtained at the end of the test after cooling. Said viscosity is the final viscosity.

3. % Amylose

Amylose content of Milled Rice is determined according to AACC Method 61-03, page 1-4.

4. Chip Density Test Procedure

The density of snacks can be related to the texture and eating quality of the snacks. The lower the density of the product the lighter texture and eating quality the product is. Low density products, such as extruded snacks, can have a slow melting eating quality and some level of tooth-packing. Products like potato and tortilla snacks have a high density, with the characteristic crunchy texture and fast melting eating quality. The rice products of this invention have a density similar to potato, and tortilla snacks, but with a more expanded texture, and a faster melt down (as shown by the low water absorption index). The products of this invention have a unique crispiness and eating quality that delivers the desired attributes from tortilla or potato snacks, and a light crunch and milder flavor. The products of this invention also have a more lubricious eating quality compared to typical rice snacks. Products of this invention ranged from 0.3 to 0.8 g/cc, preferably from about 0.35 to 0.7 g/cc, more preferably, from 0.4 to 0.7 and most preferably 0.45 to 0.55 g/cc. The density can be measured by either of the two following methods.

Density Measurement

Equipment
1. Graduated cylinder having an open end that is sufficiently large to accommodate unbroken snack pieces.
2. Balance
3. Glycerin (P&G Chemicals, Cincinnati, Ohio).

Procedure
1. Tare the graduated cylinder
2. Fill the graduated cylinder to the upper most graduation mark with glycerin. Insure that the filled graduated cylinder does not contain air bubbles.
3. Weigh the glycerin filled graduated cylinder and record the mass of the glycerin filled graduated cylinder to the nearest one hundredth of a gram. This is the mass of glycerin in the graduated cylinder=$m_{Glycerin}$
4. Empty the glycerin from graduated cylinder and clean the emptied graduated cylinder.
5. Tare the clean graduated cylinder from Step 4 above.
6. Place approximately 20 grams of unbroken test product in the graduated cylinder.
7. Weigh the graduated cylinder containing the test product and record the mass of the graduated cylinder containing the test product to the nearest one hundredth of a gram. This is the mass of the test product in the graduated cylinder=$m_{test\,product}$
8. Fill the graduated cylinder containing the test product to the upper most graduation mark with glycerin. Insure that the filled graduated cylinder does not contain air bubbles.
9. Within 5 minutes of performing Step 8 above, weigh the graduated cylinder containing the test product and glycerin and record the mass of the graduated cylinder containing the test product and glycerin to the nearest one hundredth of a gram. This is the mass of the test product and glycerin in the graduated cylinder= $m_{test\,product+glycerin}$
10. Empty and clean the graduated cylinder from Step 9
11. Repeat Steps 1 through 10 above, using fresh glycerin and test product, two additional times to obtain a total of three measurements per sample.
12. Average the three sample measurements to yield:
average $m_{1\,glycerin}$
average $m_{test\,product}$
average $m_{test\,product+glycerin}$ Calculations $\rho_{glycerin}$=1.2613 gm/mL (Density of glycerin, literature value)

average$V_{1\,glycerin}$=(average $m_{1\,glycerin}$)/($\rho_{glycerin}$)= volume of the cylinder average $m_{2\,glycerin}$=average $m_{test\,product+glycerin}$− average $m_{test\,product}$ average$V_{2\,glycerin}$=(average $m_{2\,glycerin}$)/($\rho_{glycerin}$)

average $V_{test\,product}$=average$V_{1\,glycerin}$− average$V_{2\,glycerin}$ $SV_{test\,product}$=(average $V_{test\,product}$)/ (average $m_{test\,product}$)

$\rho_{test\,product}$=1/$SV_{test\,product}$

5. % Fat Analysis

The percent of total fat in a chip can be measured by standard procedures known to those in the food arts, preferably, the total fat is measured by acid hydrolysis. Specifically, the method for measuring total fat by acid hydrolysis can be found in AOAC International (2000) 17th edition AOAC International, Gaithersburg, Md., USA, Official Methods 922.06, 954.02.

6. Chip Fracture Strength

Fracture Strength is the measurement of the force required to break a chip. The fracture strength relates to the strength of the snack, and the eating quality. The higher the fracture strength, the higher the crunchiness and crispiness of the chip. The snacks of this invention show high values of fracture strength, with a light texture and lower fat content. The products of this invention have fracture strength higher than potato snack products. The rice chips of the present invention have a fracture strength (grams force) from 100 gf to 300 gf, preferably from 180 to 280 gf, and most preferably from 200 to 250 gf.

Fracture strength can be measured by the following method.

Equipment

TA-XT2i Texture Analyzer from Texture Technologies, Scarsdale, N.Y., equipped with a 5 kg load cell.

Method
1. Probe and force calibrations are completed each day prior to analysis.
2. The sample is placed on the adjustable three point bend/snap fixture, with a gap of 20.30 mm, measured with electronic calipers, with the curve side facing downward. A knife blade with a flat 3 mm end is used to fracture the samples (TA-43, Texture Technologies).
3. The following settings are used:
    a. Measure force in compression
    b. Pre-test speed: 1.5 mm/s
    c. Test-speed: 0.5 mm/s
    d. Post-test speed: 10.0 mm/s
    e. Distance: 5.0 mm
    f. Trigger force: 5.0 g
4. Only chips free of cracks and breakage are analyzed. The chips are stored in sealed containers until analysis.
5. The following macro was used to analysis the data:
    a. Clear graph results
    b. Redraw
    c. Search forward
    d. Go to minimum time
    e. Go to absolute positive value (force)
    f. Mark value force (hardness), record value
    g. Mark value distance (fracturability), record value
6. An average of fifteen runs is used for the fracture strength.
7. Sheet Strength Test The tensile test is a mechanical stress-strain test measuring the tensile strength of a dough sheet. A dough strip is mounted by its ends onto the testing machine. The dough strip is elongated at a constant rate until the strip breaks. The force (g) at which the strip breaks is the tensile strength of the dough. The output of the tensile test is recorded as force/load versus distance/time. The sheet strength can be measured by the following method.

Equipment
4. Stable Micro Systems Texture Analyzer TA-XT2 or TA-XT2i with 25 kg load cell capacity with Texture Expert Exceed Software and a 5 kg calibration weight.
5. Instron Elastomeric Grips (Catalog #2713-001), having the following replacement parts:
    a.) Internal springs (Instron Part No. 66-1-50) replaced with springs made from 0.5842 mm diameter wire. The replacement springs must be 3.81 cm long, have an inside diameter of 0.635 cm, and a K factor of 0.228 N/mm. Said replacement Springs can be obtained from the Jones Spring Company of Wilder, Ky. U.S.A.; and
    b.) Instron Part No. T2-322 is replaced, as shown in FIGS. 8 and 9, by a modified roller plain. Said modified roller plain is an Instron Stock Part No. T2-322 that has been machined to have a flat side 4.412 cm long and 0.9525 cm wide on said roller plain's outer surface. Said flat side is covered with Armstrong Self-adhereing Tape # Tap18230 and is positioned parallel to the sample side of the Grip's Clamp Frame Lower (Instron Part No. A2-1030). The Instron Elastomeric Grips are fixed on the top and bottom of the Texture Analyzer.

Sample Preparation
1. Collect a dough sheet having a uniform thickness ranging from 0.38 mm to 2.50 mm, and a length of at least 20 cm.
2. Cut samples from the dough sheet to form dough strips that are 2.5 cm wide and 15 cm long. The strips' 15 cm length should correspond to the dough's machine direction. Cut all of the strips sequentially.
3. Protect the samples from moisture loss by placing the samples in an air-tight container. The samples must be analyzed within 10 minutes of collection to ensure that the samples are analyzed fresh.

| Texture Analyzer Settings | |
| --- | --- |
| Test Mode: | Measure Force in Tension |
| Option: | Return to Start |
| Pre-test speed: | 3.0 mm/s |
| Test speed: | 10 mm/s |
| Post test speed: | 10 mm/s |
| Distance: | 45 mm |
| Trigger Type: | Auto |
| Trigger Force: | 5 g |
| Units: | grams |
| Distance: | millimeters |
| Break Detect: | Off |

Data Analysis

The sheet tensile strength for a sample is the maximum force before a sample breaks. A dough's sheet tensile strength is the average of five sample sheet strengths.

E. Examples

Particular embodiments of the present invention are illustrated by the following non-limiting examples.

Examples 1, 2, 3, 4

The following examples illustrate physical properties of rice flour compositions of the present invention.

TABLE 1

| Rice Flour Compositions and Their Physical Properties | | | | |
| --- | --- | --- | --- | --- |
| Rice flour composition | Example 1 | Example 2 | Example 3 | Example 4 |
| WAI | 3.1 | 4.5 | 3.0 | 3.8 |
| Peak Viscosity (RVU) | 168 | 147 | 135 | 126 |
| Final Viscosity (RVU) | 184 | 247 | 151 | 143 |
| Acetylated Rice Starch Material Remygel 663 (Remy) 1.2% Acetylated | 21% | 14% | 25% | 13% |
| Waxy Rice Starch Material Remyflo S-200 (Remy) | 21% | 14% | 0 | 13% |
| Rice flour 100% extruded rice flour (Masellis Roeselare, Belgium) | 58% | 0% | 75% | 74% |
| White Rice Flour RF-GL1080 (partially cooked, long-grain rice flour, Sage V, Houston, TX). | 0 | 72% | 0 | 0 |

Examples 5, 6, 7

Dough compositions are prepared from the dry blends set forth in the Table 2 below. The dough compositions of Examples 5 and 6 comprise 65% dry blend and 35% added water. All ingredients are blended in a Turbulizer® mixer to form a loose, dry dough.

The dough is sheeted by continuously feeding it through a pair of sheeting rolls forming an elastic continuous sheet without pin holes. Sheet thickness is controlled to about 0.02 inches (0.05 cm). The back roll is heated to about 90° F. (32° C.) and the front roll is heated to about 135° F. (57° C.).

The dough sheet is then cut into oval shaped pieces and fried in a constrained frying mold at about 400° F. (204° C.) for about 8 seconds, or until desired doneness is achieved. The frying oil is a 50/50 blend of cottonseed and corn oils. The fried pieces contain about 20-25% fat.

These products have a crisp texture, fast mouth-melt and neutral flavor.

The dough composition of Example 7 comprises 65% dry blend, 2% emulsifier, and 33% added water. All ingredients are blended in a Stephan or Hobart batch dough mixer to form a loose, dry dough.

The dough is sheeted by continuously feeding it through a pair of sheeting rolls forming an elastic continuous sheet without pin holes. Sheet thickness is controlled to about 0.025 inches (0.064 cm). The back roll is heated to about 50° F. (10° C.) and the front roll is heated to about 95° F. (35° C.).

The dough sheet is then cut into oval shaped pieces and fried in an open standard fryer that comprises an initial free float zone followed by a submersion zone at about 315° F. (157° C.) for about 50 seconds. The frying oil is a 50/50 blend of cottonseed and corn oils. The fried pieces contain about 25% fat.

These products have a crisp texture, fast mouth-melt and neutral flavor.

TABLE 2

Dry Blends Comprising Rice Flour Compositions and Their Physical Properties

| | Example 5 | Example 6 | Example 7 |
|---|---|---|---|
| Ingredients (% dry blend) | | | |
| Acetylated Rice Starch Material Remygel 663 (Remy) | 10 | 10 | 10 |
| Waxy Rice Starch Material Remyflo S-200 (Remy) | 10 | 10 | 10 |
| Brown Rice Flour (Remy) | 0 | 0 | 26 |
| RF-GL1080 (partially cooked, long-grain rice flour, available from Sage V, Houston, TX) | 26 | 54 | 0 |
| Potato Flakes (Winnemucca) | 32 | 7 | 32 |
| Pre-gel Corn Meal (Cargill) | 17 | 14 | 17 |
| Maltodextrin DE 18 (Grain Procession, Muscatine, IA.) | 5 | 5 | 5 |
| Characteristics of the dry blend | | | |
| WAI (g water/g sample) | 4.7 | 3.7 | 4.7 |
| Peak Viscosity RVU | 90 | 80 | 90 |
| Final Viscosity RVU | 110 | 100 | 110 |
| Sheet Strength gram force (gf) | 215 | 160 | 200 |
| Sheet Moisture % | 29 | 28 | 28 |
| Sheet Thickness mm | 0.51 | 0.56 | 0.64 |

Examples 8, 9, 10

Dough compositions are prepared from the dry blends of Examples 8, 9, and 10 set forth in the Table 3 below. The dough compositions comprise 65% dry blend and 35% added water. All ingredients are blended in a Turbulizer™ mixer to form a loose, dry dough.

The dough is sheeted by continuously feeding it through a pair of sheeting rolls forming an elastic continuous sheet without pin holes. Sheet thickness is controlled to about 0.02 inches (0.05 cm). The back roll is heated to about 90° F. (32° C.) and the front roll is heated to about 135° F. (57° C.).

The dough sheet is then cut into oval shaped pieces and fried in a constrained frying mold at about 400° F. (204° C.) for about 8 seconds, or until desired doneness is achieved, or until desired doneness is achieved. The frying oil is a 50/50 blend of cottonseed and corn oils. The fried pieces contain about 20-25% fat.

These products have a crisp texture, fast mouth-melt and clean flavor.

TABLE 3

Dry Blends Comprising Rice Flour Compositions

| Ingredients (% dry blend) | Example 8 | Example 9 | Example 10 |
|---|---|---|---|
| Acetylated Rice Starch Material Remygel 663 (Remy) | 14 | 10 | 5 |
| Waxy Rice Starch Material Remyflo S-200 (Remy) | 14 | 10 | 10 |
| RF-GL1080 (partially cooked, long-grain rice flour, available from Sage V, Houston, TX) | 37 | 0 | 0 |
| Potato Flakes (Winnemucca) | 0 | 25 | 0 |
| Rice flour | 0 | 60 | 80 |
| 100% extruded rice flour (Sage V, Houston, TX) | | | |
| Pre-gel Corn Meal (Cargill) | 30 | 0 | 0 |
| Maltodextrin DE 18 (Grain Procession, Muscatine, IA.) | 5 | 0 | 5 |

INCORPORATION BY REFERENCE

All documents cited in the Detailed Description of the Invention are, in relevant part, incorporated herein by reference; the citation of any document is not to be construed as an admission that it is prior art with respect to the present invention.

What is claimed:

1. A rice flour composition having:
   a) from about 20% to about 90%, by weight, of a rice flour that has a Water Absorption Index (WAI) of from about 2.6 to about 9; and a Peak Viscosity from about 4 Rapid Viscosity Units (RVU) to about 130 RVU; and
   b) from about 10% to about 80%, by weight, of rice starch materials that have a WAI of below about 2.2; a Peak Viscosity from about 100 RVU to about 900 RVU and a soluble amylose content of less than 10%;
   wherein the rice flour comprises a mixture of long grain rice flour and medium grain rice flour; and wherein a portion of the rice flour in the rice flour composition has been gelatinized to an extent of from 25% to 100% gelatinization and wherein the rice starch materials comprise from about 10% to about 80% acetylated rice starch by weight of the rice flour composition.

2. The rice flour composition of claim 1, wherein the rice starch materials further comprise a rice starch material selected from the group consisting of pregelatinized rice starches, low viscosity rice starches, rice starch dextrins, acid-modified rice starches, oxidized rice starches, enzyme modified rice starches, stabilized rice starches, rice starch esters, rice starch ethers, waxy rice starch, waxy rice flour, cross-linked rice starches, acetylated rice starches, rice starch sugars, rice starch derived glucose syrup, rice starch derived dextrose, rice starch derived isoglucose, rice starches that have been modified by two or more different processes and mixtures thereof.

3. The rice flour composition of claim 1 having a Final Viscosity of from about 140 RVU to about 350 RVU.

4. A dry blend for making a fabricated snack product, wherein said dry blend comprises from about 2% to about 100% of the rice flour composition of claim 1.

5. A rice flour composition of claim 1 having a Peak Viscosity of from about 135 RVU to about 250 RVU.

6. A rice flour composition of claim 1, which has a particle size distribution wherein from about 5% to about 30% remains on a 60 mesh screen, from about 15% to about 50% remains on a 100 mesh screen, and from about 20% to about 60% remains on a 200 mesh screen.

7. A rice flour composition of claim 1, having a WAI from about 2 to about 5.

8. A dry blend for making a fabricated snack product, wherein said dry blend comprises from about 2% to about 100% of the rice flour composition of claim 2.

9. A dry blend for making a fabricated snack product, wherein said dry blend comprises from about 2% to about 100% of the rice flour composition of claim 3.

10. The dry blend of claim 4 for making a fabricated snack product, which comprises from 0% to about 20%, by weight, maltodextrin.

11. A dry blend according to claim 4, having a WAI from about 3 to about 7.

12. A dry blend according to claim 4, having a peak viscosity of from about 70 RVU to about 120 RVU.

13. A dry blend according to claim 4, having a final viscosity of from about 90 RVU to about 150 RVU.

14. A rice flour composition having:
  a) a water absorption index from about 2 to about 5;
  b) a peak viscosity from about 135 RVU to about 250 RVU; and
  c) a final viscosity from about 140 RVU to about 350 RVU;

comprising a mixture of long grain rice flour and medium grain rice flour; and wherein a portion of the rice flour in the rice flour composition has been gelatinized to an extent of from 25% to 100% gelatinization and wherein the rice flour composition further comprises rice starch materials comprising from about 10% to about 80% acetylated rice starch by weight of the rice flour composition, said rice starch materials having a soluble amylose content of less than 10%.

* * * * *